US011238489B2

(12) United States Patent
Ahluwalia et al.

(10) Patent No.: US 11,238,489 B2
(45) Date of Patent: Feb. 1, 2022

(54) METHODS AND SYSTEMS FOR PROVIDING A CAMPAIGN MANAGEMENT SUMMARY

(71) Applicant: Google LLC, Mountain View, CA (US)

(72) Inventors: Ashwinder Ahluwalia, Hayward, CA (US); Dawn Chamberlain, Sunnyvale, CA (US); Pendar Yousefi, San Francisco, CA (US); Bernard Yen, Cupertino, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/872,936

(22) Filed: May 12, 2020

(65) Prior Publication Data
US 2020/0342492 A1 Oct. 29, 2020

Related U.S. Application Data

(60) Division of application No. 15/904,022, filed on Feb. 23, 2018, now abandoned, which is a continuation of
(Continued)

(51) Int. Cl.
*G06Q 30/02* (2012.01)
(52) U.S. Cl.
CPC ..... *G06Q 30/0244* (2013.01); *G06Q 30/0242* (2013.01); *G06Q 30/0246* (2013.01); *G06Q 30/0275* (2013.01)
(58) Field of Classification Search
CPC . G09B 5/02; G06F 3/041; G06F 17/00; G06F 9/46; G06Q 30/0244
See application file for complete search history.

(56) References Cited

U.S. PATENT DOCUMENTS 6,724,403 B1 * 4/2004 Santoro ............ 715/765
9,430,519 B1 8/2016 Cai et al.
(Continued)

OTHER PUBLICATIONS

Kunle Campbell, "10 Essential Google Analytics Dashboards for Ecommerce", Sep. 9, 2014, https://www.practicalecommerce.com/10-Essential-Google-Analytics-Dashboards-for-Ecommerce, pp. 1-8 (Year: 2014).*

(Continued)

*Primary Examiner* — John Van Bramer
(74) *Attorney, Agent, or Firm* — Marshall, Gerstein & Borun LLP

(57) ABSTRACT

Methods and systems for displaying a summary of a performance of an advertising campaign are described. A system identifies advertising campaign goals of an advertising campaign. The system identifies, based on the identified goal, metrics that drive a performance of the campaign. The system identifies, for each metric, dimensions corresponding to the metric that influence a performance of the metric. The system determines, for a subset of the dimensions, that a predetermined number of criteria corresponding to the dimension contribute at least a predetermined threshold percentage of the metric. The system generates, for each metric, cards corresponding to the subset of the identified dimensions. Each card corresponds to a respective dimension and includes a graphic that identifies, for each of the predetermined number of criteria, a contribution provided by the criteria towards the performance of the metric. The system displays a subset of the cards in response to a request.

20 Claims, 7 Drawing Sheets

Related U.S. Application Data application No. 14/535,828, filed on Nov. 7, 2014, now abandoned.

(56) References Cited

U.S. PATENT DOCUMENTS

| | | | |
|---|---|---|---|
| 2006/0085741 A1* | 4/2006 | Weiner | G06F 16/972 715/246 |
| 2007/0027760 A1 | 2/2007 | Collins et al. | |
| 2007/0050778 A1* | 3/2007 | Lee | G06F 3/0481 718/107 |
| 2007/0247440 A1* | 10/2007 | Shin | G06F 3/04883 345/173 |
| 2008/0016164 A1* | 1/2008 | Chandra | H04N 1/32144 709/206 |
| 2011/0218845 A1 | 9/2011 | Medina | |
| 2011/0302025 A1 | 12/2011 | Hsiao et al. | |
| 2013/0191764 A1* | 7/2013 | Ferreira | G06F 3/0481 715/760 |
| 2013/0282483 A1 | 10/2013 | Ruarte et al. | |
| 2014/0040011 A1 | 2/2014 | Kim | |
| 2014/0249911 A1* | 9/2014 | Znerold | G06Q 30/0242 705/14.41 |
| 2015/0050633 A1* | 2/2015 | Christmas | G06F 3/14 434/322 |

OTHER PUBLICATIONS

"Turn Launches Next-Generation User Interface", Turn, 2014, retrieved Aug. 12, 2014 from URL: http://www.turn.com/news/turn-launches-next-generation-user-interface (4 pages).

Beese, Jennifer, "Track Specific Advertising Goals in Facebook's Ads Manager", Sprout Social, Apr. 2, 2013, retrieved Aug. 12, 2014 from URL: http://sproutsocial.com/insights/facebook-ads-manager-goals/ (4 pages).

Conzett, Lance, "AdWords Metrics: Summary: Raven Help", Apr. 3, 2013, retrieved Aug. 12, 2014 from URL: https://raven.zendesk.com/entries/21510695-AdWords-Metrics-Summary (3 pages).

Final Office Action for U.S. Appl. No. 14/535,828 dated Sep. 1, 2017 (47 pages).

Non-Final Office Action for U.S. Appl. No. 14/535,828 dated May 1, 2017 (55 pages).

Non-Final Office Action for U.S. Appl. No. 15/904,022 dated Jan. 13, 2020 (51 pages).

* cited by examiner

METHODS AND SYSTEMS FOR PROVIDING A CAMPAIGN MANAGEMENT SUMMARY

CROSS-REFERENCES TO RELATED APPLICATIONS

This application claims priority to and is a divisional of U.S. patent application Ser. No. 15/904,022, filed Feb. 23, 2018, entitled "METHODS AND SYSTEMS FOR PROVIDING A CAMPAIGN MANAGEMENT SUMMARY", which itself claims priority to and is a continuation of U.S. patent application Ser. No. 14/535,828, filed Nov. 7, 2014, entitled "METHODS AND SYSTEMS FOR PROVIDING A CAMPAIGN MANAGEMENT SUMMARY", the contents of each of which are incorporated herein by reference in their entirety.

BACKGROUND

In a computer networked environment such as the internet, third-party content providers provide third-party content items for display on end-user computing devices. Third-party content providers can analyze statistics of one or more advertising campaigns via a user interface.

SUMMARY

At least one aspect is directed to a computer implemented method for displaying a summary of a performance of an advertising campaign. According to one aspect, a data processing system including one or more processors can identify at least one advertising campaign goal of an advertising campaign. The data processing system can identify, based on the identified advertising campaign goal, one or more metrics that drive a performance of the advertising campaign. The data processing system can identify, for each of the one or more metrics, a plurality of dimensions corresponding to the metric that influence a performance of the metric. The data processing system can determine, for a subset of the identified dimensions corresponding to the metric, that a predetermined number of criteria corresponding to the dimension contribute at least a predetermined threshold percentage of the metric. The data processing system can generate, for each of the one or more metrics, a plurality of cards corresponding to the subset of the identified dimensions corresponding to the metric. Each card may correspond to a respective dimension of the identified dimensions and include a graphic. The graphic identifies, for each of the predetermined number of criteria, a contribution provided by the criteria towards the performance of the metric. The data processing system can display a subset of the plurality of cards in response to a request to view a summary of a performance of the advertising campaign.

In some implementations, a metric of the one or more metrics includes one of a number of impressions or a number of clicks. In some implementations, a dimension of the one or more dimensions includes one of keywords, interests, topics and placements.

In some implementations, identifying at least one advertising campaign goal includes receiving the at least one advertising campaign goal from an advertiser of the advertising campaign. In some implementations, identifying at least one advertising campaign goal includes determining, from the advertising campaign, at least one of a type of third-party content selected for display or a bid strategy.

In some implementations, the graphic is at least one of a chart or a graph. In some implementations, displaying a subset of the plurality of cards in response to a request to view a summary of a performance of the advertising campaign includes identifying, from the request, a metric for which to display performance data, generating, for the metric, cards for dimensions corresponding to the metric having a predetermined number of criteria contribute at least the predetermined threshold percentage of the metric, and displaying the generated cards corresponding to each of the dimensions for the metric. In some implementations, the data processing system can further determine, for each of the dimensions corresponding to the metric, an impact score of the dimension based on an aggregate contribution of the criteria corresponding to the predetermined number of criteria. The data processing system can determine an order in which to arrange the generated cards based on the aggregate contribution of the criteria corresponding to the predetermined number of criteria and display the cards based on the determined order.

At least one aspect is directed to a system of measuring a lift metric in a computer network environment. A lift metric can include brand lift, sales lift, among other types of lifts that can be measured. The system includes a data processing system including a content selection module and a lift metric calculation module. The data processing system can identify, based on the identified advertising campaign goal, one or more metrics that drive a performance of the advertising campaign. The data processing system can identify, for each of the one or more metrics, a plurality of dimensions corresponding to the metric that influence a performance of the metric. The data processing system can determine, for a subset of the identified dimensions corresponding to the metric, that a predetermined number of criteria corresponding to the dimension contribute at least a predetermined threshold percentage of the metric. The data processing system can generate, for each of the one or more metrics, a plurality of cards corresponding to the subset of the identified dimensions corresponding to the metric. Each card may correspond to a respective dimension of the identified dimensions and include a graphic. The graphic identifies, for each of the predetermined number of criteria, a contribution provided by the criteria towards the performance of the metric. The data processing system can display a subset of the plurality of cards in response to a request to view a summary of a performance of the advertising campaign.

In some implementations, a metric of the one or more metrics includes one of a number of impressions or a number of clicks. In some implementations, a dimension of the one or more dimensions includes one of keywords, interests, topics and placements.

In some implementations, identifying at least one advertising campaign goal includes receiving the at least one advertising campaign goal from an advertiser of the advertising campaign. In some implementations, identifying at least one advertising campaign goal includes determining, from the advertising campaign, at least one of a type of third-party content selected for display or a bid strategy.

In some implementations, the graphic is at least one of a chart or a graph. In some implementations, displaying a subset of the plurality of cards in response to a request to view a summary of a performance of the advertising campaign includes identifying, from the request, a metric for which to display performance data, generating, for the metric, cards for dimensions corresponding to the metric having a predetermined number of criteria contribute at least the predetermined threshold percentage of the metric, and displaying the generated cards corresponding to each of the dimensions for the metric. In some implementations, the data processing system can further determine, for each of the dimensions corresponding to the metric, an impact score of the dimension based on an aggregate contribution of the criteria corresponding to the predetermined number of criteria. The data processing system can determine an order in which to arrange the generated cards based on the aggregate contribution of the criteria corresponding to the predetermined number of criteria and display the cards based on the determined order.

At least one aspect is directed to a computer readable storage medium storing instructions that when executed by one or more data processors, cause the one or more data processors to perform operations. The data processing system can identify, based on the identified advertising campaign goal, one or more metrics that drive a performance of the advertising campaign. The data processing system can identify, for each of the one or more metrics, a plurality of dimensions corresponding to the metric that influence a performance of the metric. The data processing system can determine, for a subset of the identified dimensions corresponding to the metric, that a predetermined number of criteria corresponding to the dimension contribute at least a predetermined threshold percentage of the metric. The data processing system can generate, for each of the one or more metrics, a plurality of cards corresponding to the subset of the identified dimensions corresponding to the metric. Each card may correspond to a respective dimension of the identified dimensions and include a graphic. The graphic identifies, for each of the predetermined number of criteria, a contribution provided by the criteria towards the performance of the metric. The data processing system can display a subset of the plurality of cards in response to a request to view a summary of a performance of the advertising campaign.

In some implementations, a metric of the one or more metrics includes one of a number of impressions or a number of clicks. In some implementations, the metric can include conversions, conversion value/revenue, viewable impressions, clicks per impression or any number of actions that occur in interacting with the ad content. In some implementations, the metric can be based on interactions with instrumented elements of the advertiser's website, such as recording a sale. In some implementations, a dimension of the one or more dimensions includes one of keywords, interests, topics and placements.

In some implementations, identifying at least one advertising campaign goal includes receiving the at least one advertising campaign goal from an advertiser of the advertising campaign. In some implementations, identifying at least one advertising campaign goal includes determining, from the advertising campaign, at least one of a type of third-party content selected for display or a bid strategy.

In some implementations, the graphic is at least one of a chart or a graph. In some implementations, displaying a subset of the plurality of cards in response to a request to view a summary of a performance of the advertising campaign includes identifying, from the request, a metric for which to display performance data, generating, for the metric, cards for dimensions corresponding to the metric having a predetermined number of criteria contribute at least the predetermined threshold percentage of the metric, and displaying the generated cards corresponding to each of the dimensions for the metric. In some implementations, the data processing system can further determine, for each of the dimensions corresponding to the metric, an impact score of the dimension based on an aggregate contribution of the criteria corresponding to the predetermined number of criteria. The data processing system can determine an order in which to arrange the generated cards based on the aggregate contribution of the criteria corresponding to the predetermined number of criteria and display the cards based on the determined order.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of displaying a summary of a performance of an advertising campaign in a computer network environment. The various concepts introduced above and discussed in greater detail below may be implemented in any of numerous ways, as the described concepts are not limited to any particular manner of implementation.

At present, there is no way for an advertiser to understand, at a glance, how the advertiser's advertising campaigns are performing. The challenge for an advertiser today is there are lots of metrics, many of which are constantly changing, making it difficult for the advertiser to understand which metrics experienced a meaningful change or had a meaningful impact to the advertiser's campaign. To understand which metrics are relevant to the advertiser, the advertiser would have to iterate through a sea of metrics to find the ones the advertiser cares about and use a generic, table-based interface to sort, analyze and gleam insights. This is typically time consuming, especially for advertisers answering the simple questions relating to whether the advertiser should tend to an advertising campaign during the current advertising campaign management session, what caused a change in the metrics of the advertising campaign and to what aspect of the campaign the advertiser should focus their attention.

Today, advertisers can do this by going into comparison mode, for example, comparing metrics of a current week to a previous week, and then sequentially sorting the table by each column or metric to determine what drove the largest change. Often this is done within a tabular interface in the advertising campaign management user interface, or by exporting all their data and using a generic analysis tool like MS Excel and charting/triaging there.

The present disclosure relates to systems and methods of displaying a summary of a performance of an advertising campaign in a computer network environment. A data processing system including one or more processors can identify at least one advertising campaign goal of an advertising campaign, identify, based on the identified advertising campaign goal, one or more metrics that drive a performance of the advertising campaign, identify, for each of the one or more metrics, a plurality of dimensions corresponding to the metric that influence a performance of the metric, determine, for a subset of the identified dimensions corresponding to the metric, that a predetermined number of criteria corresponding to the dimension contribute at least a predetermined threshold percentage of the metric, generate for each of the one or more metrics, a plurality of cards corresponding to the subset of the identified dimensions corresponding to the metric and display a subset of the plurality of cards in response to a request to view a summary of a performance of the advertising campaign.

Figure 1:
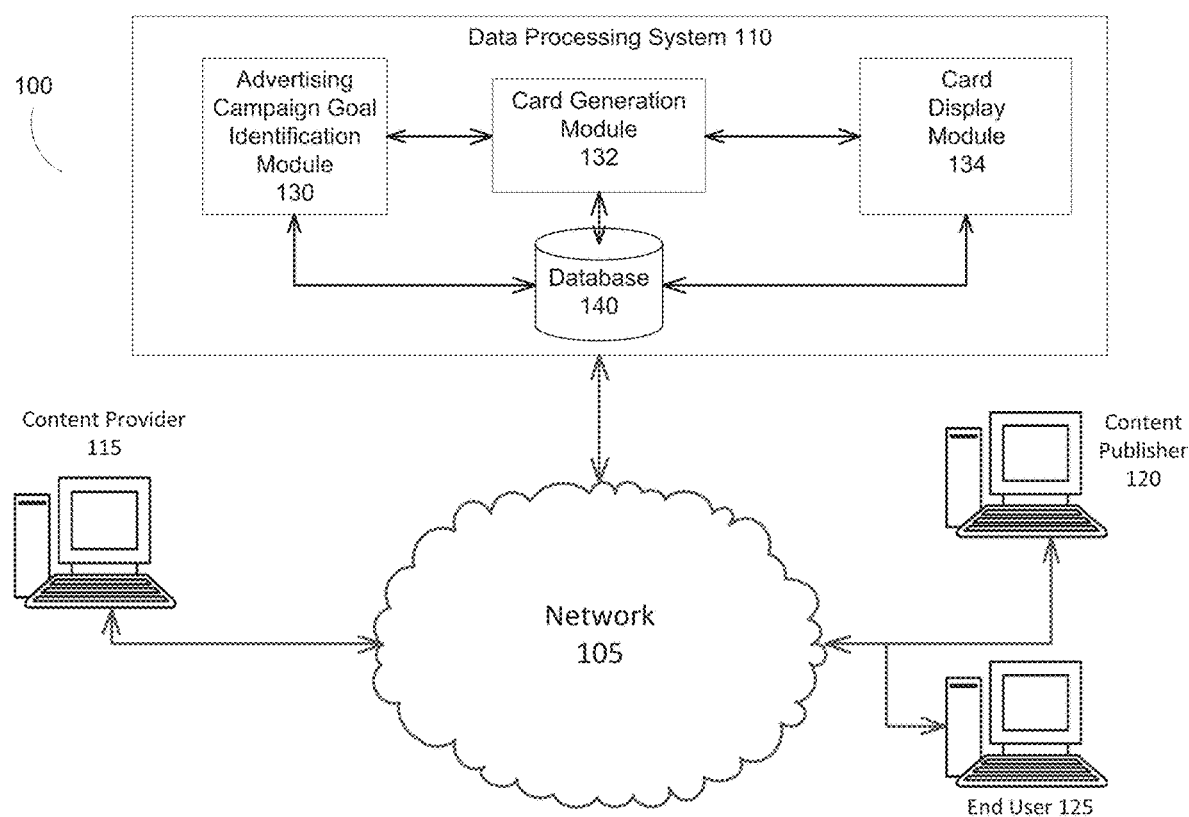
FIG. 1 is a block diagram depicting one implementation of an environment for displaying a summary of a performance of an advertising campaign in a computer network environment, according to an illustrative implementation.

FIG. 1 is a block diagram depicting one implementation of an environment for displaying a summary of a performance of an advertising campaign in a computer network environment. The environment 100 includes at least one data processing system 110. The data processing system 110 can include at least one processor and a memory, i.e., a processing circuit. The memory stores processor-executable instructions that, when executed by processor, cause the processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language. The data processing system 110 can include one or more computing devices or servers that can perform various functions. In some implementations, the data processing system can include an advertising auction system configured to host auctions. In some implementations, the data processing system does not include the advertising auction system but is configured to communicate with the advertising auction system via the network 105.

The network 105 can include computer networks such as the internet, local, wide, metro or other area networks, intranets, satellite networks, other computer networks such as voice or data mobile phone communication networks, and combinations thereof. The data processing system 110 of the system 100 can communicate via the network 105, for instance with at least one content provider computing device 115, at least one content publisher computing device 120, or at least one end user computing device 125. The network 105 may be any form of computer network that relays information between the user computing device 115, data processing system 110, and one or more content sources, for example, web servers, advertising servers, amongst others. For example, the network 105 may include the Internet and/or other types of data networks, such as a local area network (LAN), a wide area network (WAN), a cellular network, satellite network, or other types of data networks. The network 105 may also include any number of computing devices (e.g., computer, servers, routers, network switches, etc.) that are configured to receive and/or transmit data within network 105. The network 105 may further include any number of hardwired and/or wireless connections. For example, the user computing device 115 may communicate wirelessly (e.g., via WiFi, cellular, radio, etc.) with a transceiver that is hardwired (e.g., via a fiber optic cable, a CATS cable, etc.) to other computing devices in network 105.

The content provider computing devices 115 can include servers or other computing devices operated by a content provider entity to provide content items such as advertisements for display on information resources at the end user computing device 125. The content provided by the content provider computing device 115 can include third party content items or creatives (e.g., ads) for display on information resources such as a website or web page that includes primary content, e.g. content provided by the content publisher computing device 120. The content items can also be displayed on a search results web page. For instance, the content provider computing device 115 can provide or be the source of ads or other content items for display in content slots of content web pages such as a web page of a company where the primary content of the web page is provided by the company, or for display on a search results landing page provided by a search engine. The content items associated with the content provider computing device 115 can be displayed on information resources other than web pages, such as content displayed as part of the execution of an application on a smartphone or other end user computing device 125.

The content publisher computing devices 120 can include servers or other computing devices operated by a content publishing entity to provide primary content for display via the network 105. For instance, the content publisher computing device 120 can include a web page operator who provides primary content for display on the web page. The primary content can include content other than that provided by the content publisher computing device 120, and the web page can include content slots configured for the display of third party content items (e.g., ads) from the content provider computing devices 115. For instance, the content publisher computing device 120 can operate the website of a company and can provide content about that company for display on web pages of the website. The web pages can include content slots configured for the display of third party content items such as ads of the content provider computing device 115. In some implementations, the content publisher computing device 120 includes a search engine computing device (e.g. a server) of a search engine operator that operates a search engine website. The primary content of search engine web pages (e.g., a results or landing web page) can include results of a search as well as third party content items displayed in content slots such as content items from the content provider computing device 115.

The end user computing devices 125 can include computing devices configured to communicate via the network 105 to display data such as the content provided by the content publisher computing device 120 (e.g., primary web page content or other information resources) and the content provided by the content provider computing device 115 (e.g., third party content items such as ads configured for display in a content slot of a web page). The end user computing device 125, the content provider computing device 115, and the content publisher computing device 120 can include desktop computers, laptop computers, tablet computers, smartphones, personal digital assistants, mobile devices, consumer computing devices, servers, clients, digital video recorders, a set-top box for a television, a video game console, or any other computing device configured to communicate via the network 105. In some implementations, the end user computing devices 125 can be computing devices through which third-party content providers can establish, manage and modify one or more advertising campaigns. The end user computing device 125 can provide a user interface to an advertising campaign management system through which operators or managers of the advertising campaigns of a third-party content provider can establish, manage, modify or otherwise access advertising campaigns as well as statistics and other data associated with the advertising campaigns.

The content provider computing devices 115, the content publisher computing device 120 and the end user computing devices 125 can include a processor and a memory, i.e., a processing circuit. The memory stores machine instructions that, when executed by processor, cause processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language.

The content provider computing devices 115, the content publisher computing devices 120 and the end user computing devices 125 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the content provider computing devices 115, the content publisher computing device 120 and the end user computing devices 125 (e.g., a built-in display, microphone, etc.) or external to the housing of content provider computing devices 115, the content publisher computing device 120 and the end user computing devices 125 (e.g., a monitor connected to the user computing device 115, a speaker connected to the user computing device 115, etc.), according to various implementations. For example, the content provider computing devices 115, the content publisher computing device 120 and the end user computing devices 125 may include an electronic display, which visually displays web pages using webpage data received from one or more content sources and/or from the data processing system 110 via the network 105. In some implementations, a content placement campaign manager or third-party content provider, such as an advertiser, can communicate with the data processing system 110 via the content provider computing devices 115. In some implementations, the advertiser can communicate with the data processing system 110 via a user interface displayed on the user interface devices of the content provider computing devices 115.

The data processing system 110 can include at least one server. For instance, the data processing system 110 can include a plurality of servers located in at least one data center or server farm. In some implementations, the data processing system 110 includes a content placement system, e.g., an ad server or ad placement system. The data processing system 110 can include at least one advertising campaign goal identification module 130, at least one card generation module 132, at least one card display module 134 and at least one database 140. The advertising campaign goal identification module 130, the card generation module 132 and the card display module 134 can each include at least one processing unit, server, virtual server, circuit, engine, agent, appliance, or other logic device such as programmable logic arrays configured to communicate with the database 140 and with other computing devices (e.g., the content provider computing device 115, the content publisher computing device 120, or the end user computing device 125) via the network 105.

The advertising campaign goal identification module 130, the card generation module 132 and the card display module 134 can include or execute at least one computer program or at least one script. The advertising campaign goal identification module 130, the card generation module 132 and the card display module 134 can be separate components, a single component, or part of the data processing system 110. The advertising campaign goal identification module 130, the card generation module 132 and the card display module 134 can include combinations of software and hardware, such as one or more processors configured to execute one or more scripts to identify at least one advertising campaign goal of an advertising campaign, identify, based on the identified advertising campaign goal, one or more metrics that drive a performance of the advertising campaign, identify, for each of the one or more metrics, a plurality of dimensions corresponding to the metric that influence a performance of the metric, determine, for a subset of the identified dimensions corresponding to the metric, that a predetermined number of criteria corresponding to the dimension contribute at least a predetermined threshold percentage of the metric, generate for each of the one or more metrics, a plurality of cards corresponding to the subset of the identified dimensions corresponding to the metric and display a subset of the plurality of cards in response to a request to view a summary of a performance of the advertising campaign, for example.

The data processing system 110 can also include one or more content repositories or databases 140. The databases 140 can be local to the data processing system 110. In some implementations, the databases 140 can be remote to the data processing system 110 but can communicate with the data processing system 110 via the network 105. The databases 140 can store advertising campaigns of one or more third-party content providers. In some implementations, the databases 140 can store information related to one or more auctions, ads selected via the auction as well as the performance of each of the ads. In some implementations, the databases 140 can store information used to derive or calculate values of one or more performance metrics of advertising campaigns. Additional details of the contents of the databases 140 will be provided below.

The advertising campaign goal identification module 130 can be configured to identify at least one advertising campaign goal of an advertising campaign. A third-party content provider or advertiser can establish or create one or more advertising campaigns. These advertising campaigns can be designed, constructed or configured to present ads in one or more ad slots on various information resources, for example, web pages. The advertiser can design the advertising campaign such that the ads can be shown on specific information resources. In some implementations, the advertising campaign can also include bid prices the advertiser is willing to pay to display the ad or if an action is taken on the ad.

The advertising campaign goal identification module 130 can identify at least one advertising campaign goal of an advertising campaign. A third-party content provider or advertiser can establish or create one or more advertising campaigns. These advertising campaigns can be designed, constructed or configured to present ads in one or more ad slots on various information resources, for example, web pages. The advertiser can design the advertising campaign such that the ads can be shown on specific information resources. In some implementations, the advertiser can design the advertising campaign such that the ads can be shown to end user computing devices having certain profiles, for example, interests. In some implementations, the advertiser can design the advertising campaign such that the ads can be shown on web pages related to certain topics or keywords. In some implementations, the advertiser can design the advertising campaign such that the ads can be shown to end user computing devices included in one or more remarketing lists. In some implementations, the advertiser can set bid prices corresponding to an amount the advertiser is willing to pay to display the ad. Bids based on impressions can be based on cost per thousand impressions or cost per thousand (CPM). In some implementations, the advertiser can set bid prices corresponding to an amount the advertiser is willing to pay if an action is taken on the ad once the ad is displayed. In some implementations, bids based on actions can be based on cost per click or cost per action.

In some implementations, the advertising campaign goal identification module 130 can identify the advertising campaign goals of an advertising campaign by receiving the advertising campaign goals from an advertiser of the advertising campaign. In some implementations, the advertising campaign goal identification module 130 can submit a request to the advertiser requesting the advertiser to identify one or more advertising campaign goals of the advertising campaign. In some implementations, the advertising campaign goal identification module 130 can send a survey or a set of questions to the advertiser. The advertising campaign goal identification module 130 can identify the advertising campaign goals of the advertising campaign based on responses to the survey sent to the advertiser.

In some implementations, the advertising campaign goal identification module 130 can identify the advertising campaign goals of the advertiser based on one or more parameters, rules, or features of the advertising campaign. In some implementations, the advertising campaign goal identification module 130 can determine one or more goals of the advertising campaign based on the parameters of the advertising campaign relative to other advertising campaigns of the advertiser or relative to advertising campaigns of other advertisers competing in the same auctions.

In some implementations, the advertising campaign goal identification module 130 can identify goals by analyzing various parameters of the advertising campaign. In some implementations, the advertising campaign goal identification module 130 can be configured to identify the advertising campaign goals of the advertiser by determining, from the advertising campaign, a bid strategy implemented by the advertising campaign. In some implementations, the advertising campaign goal identification module 130 can determine the goals of an advertising campaign based on bid prices of the advertising campaign. In some implementations, the advertising campaign goal identification module 130 can determine the goals of an advertising campaign based on whether the advertiser is bidding on an impression basis or a per action basis. For instance, if the advertiser is willing on a per impression basis, the advertiser may be seeking to increase brand awareness by paying for impressions. Conversely, an advertiser that sets their bidding strategy to one that pays a bid amount once an action is taken on the ad, such as a click or conversion, the advertiser may likely be seeking to increase conversions or sales. Some advertisers may be in between the two spectrums of increasing brand awareness and increasing sales. It should be appreciated that advertisers having different goals may be interested in different types of metrics, as will be described below.

In some implementations, the advertising campaign goal identification module 130 can determine one or more goals of an advertising campaign by analyzing the types of content items or ads the advertiser provides for display. For instance, advertisers seeking to increase brand awareness may display ads with video, graphics or other features, while advertisers seeking to increase sales may display ads that are more simple and likely to cause an action to be taken on the ad that results in a conversion. The advertising campaign goal identification module 130 can be configured to heuristically determine which types of ads are more likely used to increase brand awareness and which types of ads are more likely to increase sales or conversions.

The advertising campaign goal identification module 130 can also determine one or more goals of an advertising campaign by analyzing one or more content selection dimensions of the advertising campaign. Examples of various dimensions include, but are not limited to keywords, interests and remarketing lists, topics, placements, demographics among others. The keyword dimension allows an advertiser to place bids to display content in auctions for certain keywords. The advertiser can select the keywords on which to place bids. The interests and remarketing dimension allows an advertiser to serve ads to end user computing devices identified based on the end user computing devices association with particular interests or remarketing lists selected by the advertiser in the interests and remarketing dimension. The topics dimension allows an advertiser to serve ads on web pages related to topics selected by the advertiser in the topics dimension. The placements dimension allows an advertiser to serve ads on web pages selected by the advertiser in the placements dimension.

An advertising campaign that includes a larger set of criteria in one or more dimensions may indicate that the advertising campaign is trying to increase the reach of the advertising campaign and therefore, is likely more focused on brand awareness relative to sales. Conversely, advertising campaigns that are directed towards a smaller set of criteria are likely to target a smaller set of end user computing devices and therefore, is likely more focused on sales relative to brand awareness.

In some implementations, goals can be identified based on explicit or implicit signals from the advertiser. In the explicit case, the advertiser may identify a particular business objective and key performance indicator. This can help the data processing system 110 understand the portion of the consumer decision funnel the advertiser is attempting to influence with marketing (awareness, consideration, purchase, loyalty) and the metric by which the advertiser may do so (number of users reached, ad views, website visits, phone calls, in-store visits, sales, and revenue in sales, revenue in customer lifetime sales, among others). In some cases, the advertiser may elect to not explicitly share its goals, in which case the data processing system 110 may infer goals from the advertiser's advertising campaign settings (for example, consumer selection and filtering criteria may be used to drive awareness to certain types of consumers, and other factors like the advertiser's bidding strategy, reporting setup, ad types used, among others).

Figure 2:
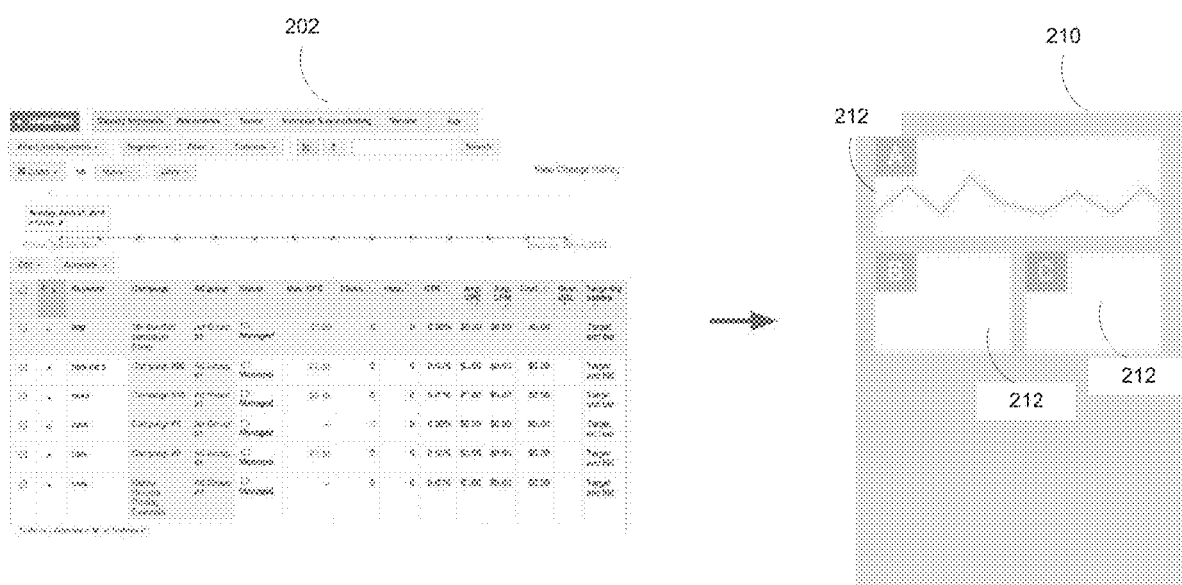
FIG. 2 is a diagram illustrating a conversion of data presented in a tabular form into cards, according to an illustrative implementation.

In some implementations, the advertising campaign goal identification module 130 may present advertising campaign statistics to advertisers via a user interface that displays one or more metrics in tabular form. FIG. 2 is a diagram illustrating a conversion of data presented in a tabular form into cards, according to an illustrative implementation. As shown in FIG. 2, the user interface 202 presenting data in tabular form requires a user to review the data in various rows and columns to try to understand how the advertising campaign is performing. Moreover, the user interface 202 can be intimidating to less savvy advertisers. In many advertising campaigns, one or more of the content selection dimensions may have a handful of impactful criteria that cause the bulk of the impact of the dimension. The advertising campaign goal identification module 130 110 is configured to extract information from the data presented in the tabular form and present insights based on the data in a visually appealing format that includes a plurality of cards highlighting criteria of dimensions that have the greatest impact on the advertising campaign. A mock display 210 including a plurality of cards 212 representative of various dimensions and/or criteria is shown.

Referring back to FIG. 1, in some implementations, the data processing system 110 can track the performance of ads displayed via an advertising campaign. The advertising campaign goal identification module 130 or the data processing system 110 can maintain a log of all ads provided for display, the one or more dimensions of the advertising campaign that caused the ad to be provided for display, the bid amount and type at which the ad was displayed, one or more criteria or profile characteristics of the end user computing device to which the ad was provided for display, the type of information resource or web page on which the ad was provided for display, the type of ad provided for display, and one or more actions, if any, that were taken on the ad when provided for display. The data processing system 110 may store all of this information in a log stored in a database, such as the database 140.

In some implementations, the advertising campaign goal identification module 130 can also be configured to identify, based on one or more of the identified advertising campaign goals, one or more metrics that drive a performance of the advertising campaign. In some implementations, metrics that can drive a performance of the advertising campaign can include a number of impressions or a number of converting actions. Converting actions can include clicks or some other converting action, such as signing up, making a purchase, providing an email address, participating in a survey, among others.

In some implementations, there are various driving factors that determine whether a metric should be shown. First, there may be several data points that are statistically insignificant (either not-enough-data-yet to be meaningful, or contributing too little to overall performance. There may be a number of ways to compute data points that are statistically insignificant. In some implementations, the data processing system 110 can determine, based on a statistical analysis across a plurality of advertisers, a minimum number of click or impressions that may be needed to make statistically meaningful assertions about campaign performance. For example, how many clicks are needed before a representative click through rate can be identified. For instance, if an advertiser only has 1 click and 5 impressions, the advertiser will probably need to get more clicks to assert that the click through rate is 20%. In some implementations, the data processing system 110 may compute a network-wide threshold that is applied to every advertiser. In some implementations, the threshold can be specific to a particular industry or advertiser.

Another driving factor that determines whether a metric should be shown is determining which data points are most relevant or interesting to show. Accordingly, the data processing system 110 can establish a metric of 'interestingness' which looks at how much a particular data point contributes to an overall trend (for instance, a number of clicks on a particular ad, total number of clicks, how much that data point has deviated from the average behavior of the data point (seasonally high clicks on an ad) or how much that data point has contributed to the change in an overall metric (for example, a campaign saw 40% more clicks because one of the ads of the campaign received a 100% increase in the number of clicks for the dates specified by the advertiser when generating a report.

Based on the log containing data related to all ads provided for display, the advertising campaign goal identification module 130 can determine one or more metrics associated with the advertising campaign. Examples of metrics that the data advertising campaign goal identification module 130 can track and display include impressions, clicks, click through rate, costs per action, among others.

The advertising campaign goal identification module 130 can determine, from the metrics tracked by the advertising campaign goal identification module 130, one or more metrics that may drive the performance of the advertising campaign. These metrics may be related to the identified goals of the advertising campaign. For instance, if the goal of the advertising campaign is to increase impressions, metrics that would be pertinent to the goal and that drive the performance of the advertising campaign may include impressions and average cost per thousand impressions (CPM). If the goal of the advertising campaign is to increase revenues or sales, the metrics that may be pertinent to the goal and that drive the performance of the advertising campaign may include sales, click through rate, and costs per conversion, among others.

The advertising campaign goal identification module 130 can be configured to identify, for each of the one or more metrics, a plurality of dimensions corresponding to the metric that influence a performance of the metric. The advertising campaign goal identification module 130 can identify, using the auction log, the performance of ads displayed via the advertising campaign and determine, for each of the one or more metrics identified as driving the performance of the advertising campaign, one or more dimensions corresponding to the metric that influence the performance of the metric. For instance, the advertising campaign goal identification module 130 may determine that the metric click through rate, drives the performance of an advertising campaign, such as the advertising campaign to which the display of FIG. 3 corresponds. The advertising campaign goal identification module 130 can identify, for the click-through metric, one or more dimensions corresponding to the impressions metric that influence or contribute to the performance of the metric. A dimension may be determined to influence a performance of the metric if the level of influence exceeds a predetermined threshold. For instance, if ads selected based on keywords receive a predetermined threshold percentage of the number of total impressions received by ads of the advertising campaign, the data processing system may determine that keywords is a dimension that influences a performance of the metric. Conversely, if ads selected based on another dimension, such as topics, receive less than a predetermined threshold percentage of the number of total impressions received by ads of the advertising campaign, the advertising campaign goal identification module 130 can determine that the topics dimension fails to meaningfully influence the performance of the metric. It should be appreciated that click-through rate is a function of total impressions and as such, dimensions that do not influence impressions are unlikely to influence click-through rate of the advertising campaign. In some implementations, the predetermined threshold percentage can be anywhere from 5%-100%.

The card generation module 132 can determine, for a subset of the identified dimensions corresponding to the metric, that a predetermined number of criteria corresponding to the dimension contribute at least a predetermined threshold percentage of the metric. In some implementations, the card generation module 132 can determine, for a subset of the identified dimensions corresponding to the metric, that a predetermined number of criteria corresponding to the dimension contribute at least a predetermined threshold percentage of the metric in response to identifying, for each of the one or more metrics, a plurality of dimensions corresponding to the metric that influence a performance of the metric.

For a given metric, the card generation module 132 can identify the plurality of dimensions that influence the performance of the metric. Upon identifying the plurality of dimensions that influence the performance of the metric, the card generation module 132 can determine, for each of the dimensions identified as influencing the performance of the metric, one or more criteria of the dimension that contribute at least a predetermined threshold percentage of the metric. For instance, if the metric is click-through rate, and the card generation module 132 determines that keywords is one dimension that influences the click-through rate metric, the data processing system can determine, for the keywords dimension, one or more keywords that contribute at least a predetermined threshold percentage of the metric. To do so, the card generation module 132 can first determine all of the criteria of the keywords dimension. The data processing system can determine all of the criteria of the keywords dimension by identifying each of the ads selected for display that contributed in the total number of impressions received by the advertising campaign.

For each ad selected for display, the card generation module 132 can determine if the ad was selected based on the information resource or web page matching a keyword included in the keywords dimension selected by the advertiser when establishing the advertising campaign. If the ad was selected based on a keyword included in the keywords dimension, the card generation module 132 counts the impression towards an impression count for the given keyword.

Once all of the ads selected for display are analyzed to see if a keyword of the keywords dimension should receive an impression count, the card generation module 132 tallies or aggregates the impression counts for each of the keywords in the keyword dimension. The card generation module 132 can then determine, for each keyword in the keywords dimension, if the impression count of the keyword exceeds a predetermined threshold that is based on the total number of impressions received by the ads of the advertising campaign. A similar process can be implemented for determining criteria for various dimensions. It should be appreciated that there are a finite number of criteria for each dimension and the criteria are included in the advertising campaign of the advertiser.

In some implementations, the card generation module 132 can then select only those keywords that have an impression count that exceeds the predetermined threshold, for example, 5% of all impressions received by ads of the advertising campaign. In some implementations, the card generation module 132 can select a predetermined number of keywords, for instance, the top six keywords with the highest impression count.

When given a metric of interest, the data processing system 110 can determine auxiliary metrics to show based on a number of factors. The auxiliary metrics can include metrics directly involved in the computation of the main metric (e.g. for click through rate, which is equal to a ratio of clicks to impressions, the data processing system 110 can also show clicks and impressions). In some implementations, the auxiliary metrics can also include metrics that lend context to the main metric or its components. For example, when the data processing system 110 displays click through rate, the data processing system 110 can also show the 'average click conversion rate' to help the advertiser assess the quality of the clicks the advertiser is getting by indicating how often a click leads to a sale. In some implementations, the auxiliary metrics can include dimensions on which there is significant variance for the metric, e.g. for click through rate, showing the rate on smartphones vs desktop computers because they vary considerably.

In some implementations, the cards may include content that is relevant to an advertiser during a particular phase of the advertiser's campaign. For instance, the cards may include a first set of metrics that may be pertinent to the advertiser based on a predetermined time range relative to a launch date of the advertiser's campaign. For instance, a first set of metrics may be more relevant to the advertiser within the first week of the launch of the campaign than a second set of metrics, which may be more relevant to the advertiser after the first week of the launch. In some implementations, the cards can include content based on different metrics based on the type of industry to which the advertiser belongs. In some implementations, the cards may include content based on different campaign goals. In some implementations, the cards may include content based on a particular phase of the conversion funnel that the advertiser is trying to target. In some implementations, the cards may include content based on the types of customers interacting with the advertisements. In some implementations, the cards may include content based on a particular time of day, week or month, In some implementations, the cards may include content that is included based on an upcoming event, such as a holiday. In some implementations, the cards may include content that is included based on whether the advertiser accesses the user interface via a smartphone, mobile phone, desktop, laptop, or tablet. In some implementations, the cards may include content that is included based on activity of the customers, for instance, sudden spikes of traffic, or commonalities between the customers, among others. For instance, the cards may include content that 90% of customers accessing the advertisement previously visited a particular website (for example, a blog post or an article). In some implementations, the cards my include content that is included based on activities performed by a percentage of the consumers accessing the advertisement.

Figure 3:
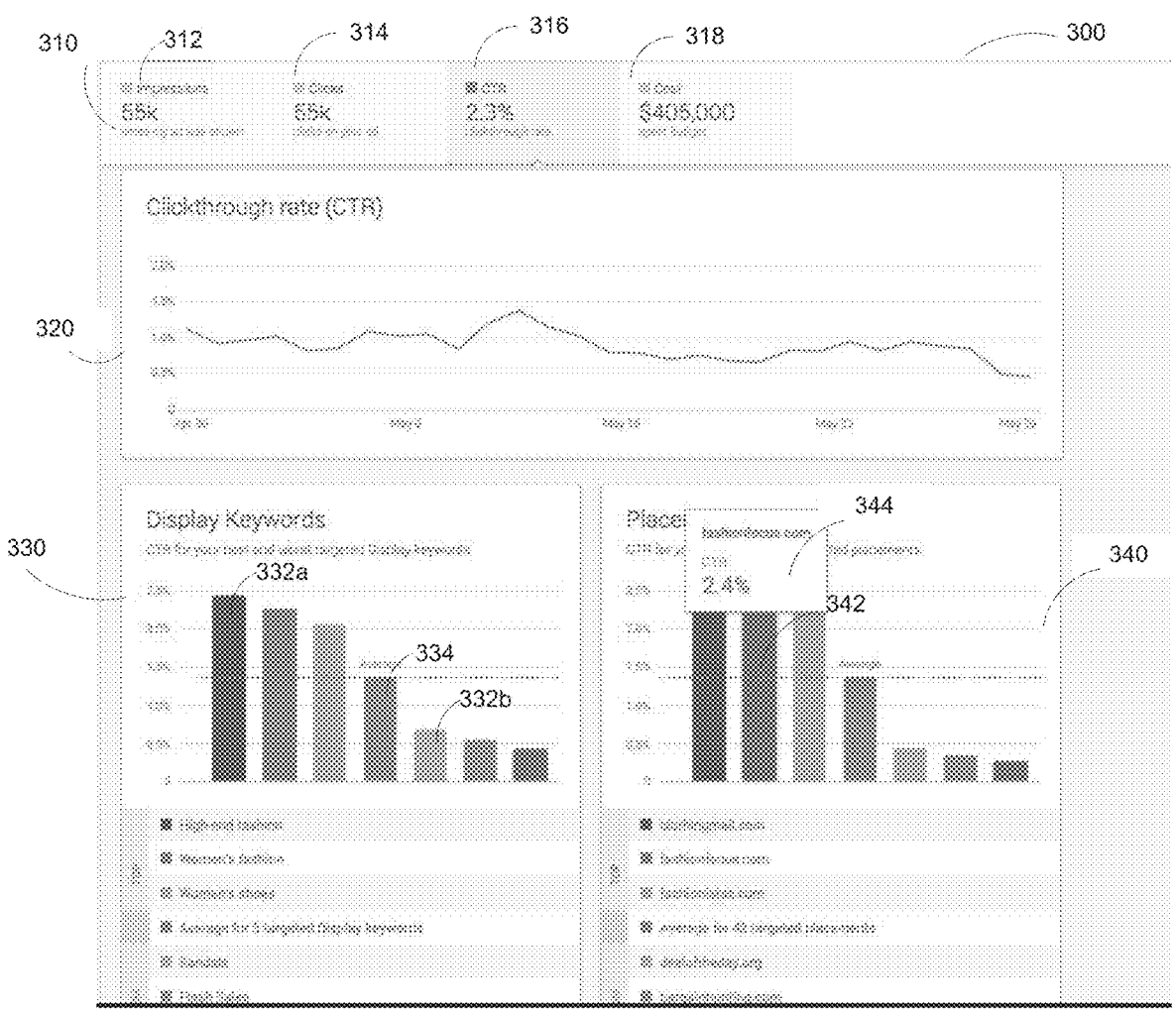
FIG. 3 is a portion of a display of a summary tab portion including a plurality of cards including pertinent content, according to an illustrative implementation.

FIG. 3 is a portion of a display of a summary tab portion including a plurality of cards including pertinent content, according to an illustrative implementation. In some implementations, the display 300 is provided for display on a screen of an advertiser's computing device responsive to an action taken on a summary tab actionable item. The display 300 includes a ribbon 310 that includes a plurality of actionable items 312-318 corresponding to different metrics. The ribbon includes an impressions metric item 312, a clicks metric item 314, a click-through rate metric item 316 and a cost metric item 318 corresponding to a total amount of money spent by the advertiser on the advertising campaign. The metric items shown on the ribbon 310 may vary based on the goals of the advertising campaign to which the display corresponds. The metric items shown in ribbon 310 may correspond to an advertising campaign that has a goal of increasing revenue or increasing impressions or both. In some implementations, the advertising campaign goal identification module 130 can be configured to determine a goal of the advertising campaign by analyzing metrics of the advertising campaign and comparing the metrics to metrics of other advertising campaigns of the advertiser or advertising campaigns of other advertisers.

In FIG. 3, the click-through rate metric item 316 is selected, and as such, one or more cards corresponding to the click-through rate metric are provided for display in the display 300. A leaderboard 320 can be a card that extends along the width of the display and appears just below the ribbon. The leaderboard 320 displays a graph of the click-through rate metric over a predetermined time period. The display 300 also displays one or more dimension-specific cards corresponding to dimensions of the click-through rate. The display 300 includes a display keywords dimension card 330 that shows click-through rate information relating to various criteria of the keywords dimension. The keywords dimension card 330 includes a bar chart including seven bars. Three of the bars including bar 332a correspond to the top three performing keywords, or stated in another way, the keywords having the highest click through rates. Three of the other bars including bar 332b correspond to the three worst performing keywords, or stated differently, the keywords having the lowest click through rates. In addition, a seventh bar represents the average click through rate of all the keywords in the keywords dimension that received impressions. Through this card, an advertiser can identify the three worst performing keywords and decide to amend the targeting criteria of dimensions to remove the three worst performing keywords. Alternatively, the advertiser can identify the top three performing keywords and increase the spend amount allocated to each of these keywords.

The display 300 also includes a placements dimension card 340. Similar to the keywords dimension card 330, the placements dimension card 340 includes a plurality of bars. A pop up icon appears when a cursor is positioned over one of the bars. As shown in FIG. 3, the pop up icon 344 appears when the cursor is positioned over the bar 342. The display 300 can include additional cards below the display keywords dimension card 330 and placements dimension card 340.

In some implementations, the advertiser can take actions on one or more of the cards. In some implementations, the advertiser, via a touch screen user interface of the device through which the advertiser is viewing the cards, can swipe away cards. In some implementations, the direction or type of swipe can represent different actions, for instance, remove permanently, remind later (snooze), move to top or bottom, save to favorites, among others. In some implementations, the cards can be different colors, shapes or sizes to signify different things. For instance, the colors can represent different priority levels. In some implementations, the cards can include one or more actionable items, The actionable items can be buttons or icons to close, minimize, or hide the card. In some implementations, the actionable items can be buttons or icons to save the cards to favorites. In some implementations, the actionable item can be a button or item, which when selected, causes the processing circuit, to implement one or more changes to the advertising campaign. For instance, the actionable item can be a "suspend" button, which suspends the campaign. In some implementations, the actionable item can be an "optimize" button, which optimizes the settings of the advertising campaign.

Figure 4A:
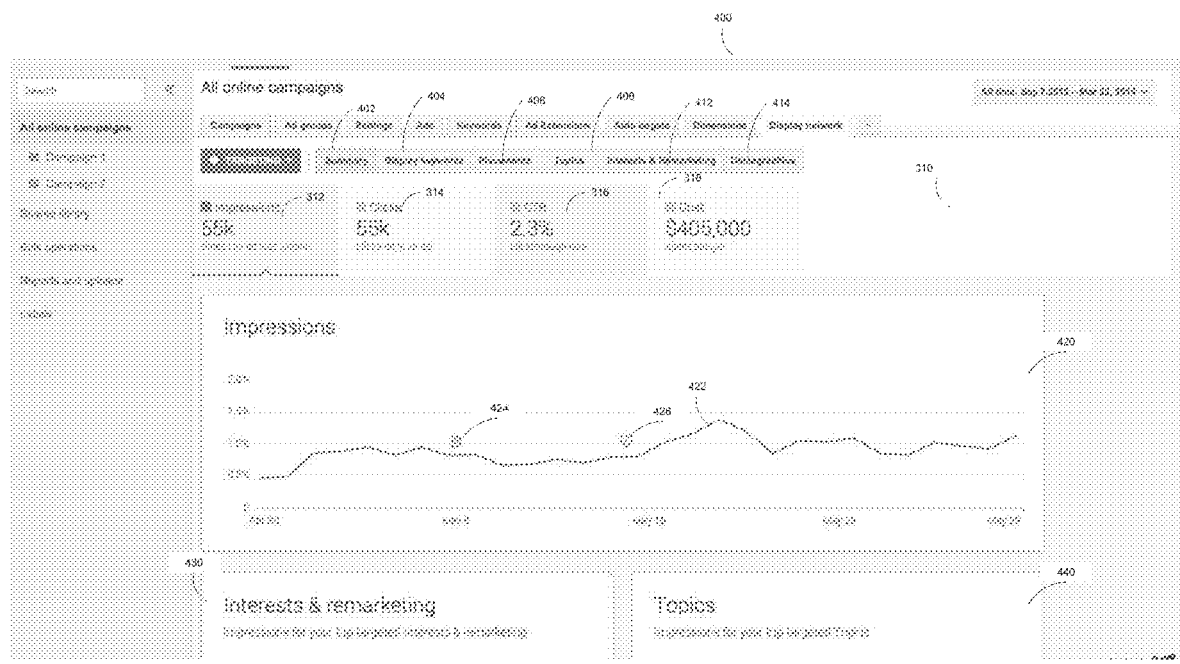
FIG. 4A is a screenshot depicting a portion of a display depicting contents of a summary tab including information related to an impressions metric, according to an illustrative implementation.

FIG. 4A is a screenshot depicting a portion of a display depicting contents of a summary tab including information related to an impressions metric, according to an illustrative implementation. The display 400 corresponds to a particular advertising campaign of an advertiser. The advertising campaign includes one or more content selection or targeting parameters. The content selection parameters include a display keywords dimension 404, a placements dimension 406, a topics dimension 408, an interests and remarking dimension 412 and a demographics dimension 414. In addition, the display includes a summary tab object 402, which when selected, displays the ribbon 310, the leaderboard 420 and various dimension cards, such as the interests and remarketing dimensions card 430 and the topics card 440. The leaderboard 420 corresponds to the impressions metric item 312 and shows a line graph 422 over a predetermined period of time. The leaderboard 420 can be dynamic and interactive. In some implementations, the leaderboard 420 can include one or more actionable objects 424 and 426 positioned at various points along the graph 422 that correspond to certain dates along the predetermined time period. The actionable objects 424 and 426 can correspond to changes made to the advertising campaign, for example, an increase to a bid amount, or adding new keywords to the keywords dimension. In this way, an advertiser can easily understand that a particular change in the graph around a particular actionable object may be linked to a change to the advertising campaign that is identified by the actionable object.

Figure 4B:
FIG. 4B is a screenshot depicting additional cards corresponding to the impressions metric of FIG. 4A, according to an illustrative implementation.

FIG. 4B is a screenshot depicting additional cards corresponding to the impressions metric of FIG. 4A, according to an illustrative implementation. The interests and remarketing dimension card illustrates a chart representing various interests and remarketing lists that contributed towards the impressions. When a cursor is positioned over the portion 432, a popup item 434 appears indicating a size of the portion in terms of percentages as well as a description of the criteria of the interests and remarketing dimension that corresponds to the portion 432. In card 430, the top five performing interests and remarketing criteria are shown, while a sixth portion corresponds to the remaining interests and remarketing criteria. A similar card is shown for the topics dimension card 440.

Referring back to FIG. 1, the card generation module 132 can generate for each of the one or more metrics, a plurality of cards corresponding to the subset of the identified dimensions corresponding to the metric. Each card can correspond to a respective dimension of the identified dimensions and include a graphic. The graphic can identify, for each of the predetermined number of criteria, a contribution provided by the criteria towards the performance of the metric. Referring to the keywords dimension card 330 shown in FIG. 3, a chart including bars representing the top 6 keywords in terms of impression count are shown and the height of the bars indicate a click through rate of the respective keyword associated with the bar. For instance, a bar 332a represents the keyword "High-end Fashion" and has a click through rate of about 2.4%, while a bar 332b represents the keyword "Sandals" and has a click through rate of about 0.6%. A bar 334 represents the average click-through rate of ads selected based on the keywords dimension.

The card generation module 132 can generate a plurality of cards for each of the metrics identified as driving the performance of the advertising campaign. For each metric, the card generation module 132 can generate a card for each dimension identified as influencing the performance of the identified metric. The card generation module 132 can generate the card using information associated with criteria of the dimension identified as influencing the performance of the identified metric. The card generation module 132 can generate a card including a graphic that depicts one or more of the criteria identified as contributing towards the metric. The graphic can show a value of each of the criteria that corresponds to the metric. In some implementations, the graphic can also show an average value based on the impressions received by ads of the advertising campaign that were selected based on the dimension. The graphic can include a bar chart, a pie chart, a line graph, or any other visual that can identify an impact a particular criterion of the dimension has on the metric. In some implementations, the graphic can be dynamic in that when a mouse, cursor or other object engages with the visual object representing a particular criteria, a value may be displayed, such as the pop up 344 shown in FIG. 3

The card can be a visual object that can be positioned any various locations on a screen. Each card can operate as an independent structure that can be expanded or collapsed independent of other cards. Each card can have one or more actionable objects for maximizing, minimizing, or collapsing the card. In some implementations, the card can be removed from the display via an action on a touch screen. In some implementations in which the real estate of a screen of a computing device is limited, such as on a mobile device, the number and size of the cards generated may be altered to fit within the display of the computing device.

In some implementations, the present disclosure may facilitate the display of information on mobile displays where real estate is limited and extracting information from tabular data may be more difficult. A card-based reporting interface is more flexible and can adapt to the size of the display, by showing fewer or more cards, while being consistent across many screens. In a mobile device, the data processing system 110 may create card piles for the user to thumb through, and enable users to drag/drop/move cards around as they are the more basic unit of reporting. In some implementations, the data processing system 110 may determine what cards and metrics to show based on the space available and the user's differential interest in reporting data when using a mobile device.

The card display module 134 can display a subset of the plurality of cards in response to a request to view a summary of a performance of the advertising campaign. In some implementations, the card display module 134 can receive a request from an advertiser to display a summary of the performance of the advertising campaign. In some implementations, the card display module 134 can provide a user interface that includes a tab or actionable object, which when an action is taken on, causes the card display module 134 to provide a summary of the advertising campaign. The summary is based on one or more of the identified goals of the advertising campaign. As such, if the identified goal of the advertising campaign is brand awareness, the summary can display information related to metrics that are relevant to brand awareness, for instance, impressions and click through rate. Conversely, if the identified goal of the advertising campaign is revenue growth or generation, the summary can display information related to metrics that are relevant to revenues, for instance, sales and cost per conversion.

The card display module 134 can provide, for display, one or more selectable metric objects, which when selected, display information specific to the selected metric. The data processing system can also display, on the same user interface, a leaderboard that displays a graph of the particular metric over a predetermined time period. In some implementations, the graph can be dynamic and interactive. In some implementations, the graph can include one or more actionable objects positioned at various points along the graph that correspond to certain dates along the predetermined time period. The actionable objects can correspond to changes made to the advertising campaign, for example, an increase to a bid amount, or adding new keywords to the keywords dimension. In this way, an advertiser can easily understand that a particular change in the graph around a particular actionable object may be linked to a change to the advertising campaign that is identified by the actionable object.

The card display module 134 can also display cards corresponding to dimensions of the metric. In some implementations, each card can be dedicated to a particular dimension of the metric. In some implementations, the card display module 134 can position the cards on the display in order of impact. In some implementations, the cards can be positioned on the display according to an order of attention. That is, cards corresponding to dimensions that are adversely affecting the performance of the advertising campaign may be displayed before cards corresponding to dimensions that are positively affecting the performance of the advertising campaign. In some implementations, the size, background color and shape of the cards may also indicate whether the dimension is adversely or positively affecting the performance of the advertising campaign.

In some implementations, the card display module 134 can determine, for each of the dimensions corresponding to a given identified metric, an impact score of the dimension based on an aggregate contribution of the criteria corresponding to the predetermined number of criteria. The card display module 134 can determine an aggregate contribution of the criteria of the dimension corresponding to the predetermined number of criteria to be included in the card. As described above, the predetermined number of criteria can be six. To determine the aggregate contribution of the top six criteria of the dimension, the card display module 134 can determine a metric value based on ads selected for display based on the top six criteria of the dimension. For instance, if the metric is impressions and the dimension is placements, the card display module 134 can determine the total number of impressions received by ads selected for display based on the top six websites included in the placements dimension. The card display module 134 can then determine an order in which to arrange the generated cards based on the aggregate contribution of the criteria corresponding to the predetermined number of criteria and display the cards based on the determined order.

Figure 5:
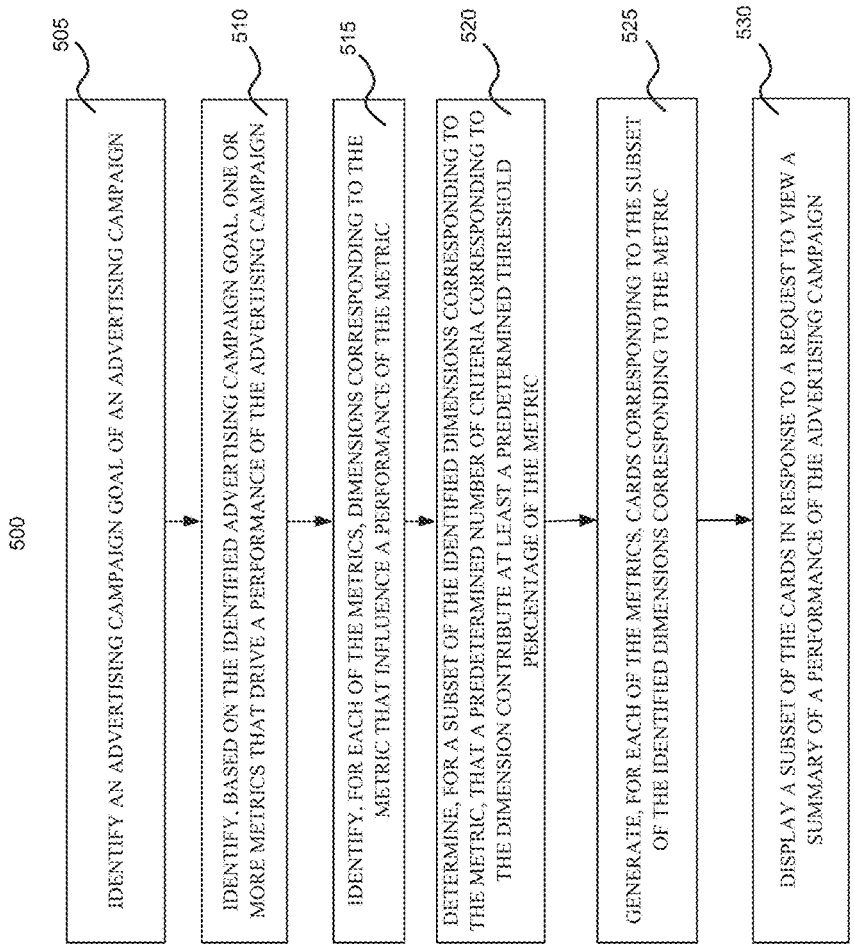
FIG. 5 is a flow diagram depicting a method for displaying a summary of a performance of an advertising campaign in a computer network environment, according to an illustrative implementation.

FIG. 5 is a flow diagram depicting a method for displaying a summary of a performance of an advertising campaign in a computer network environment. The method 500 can identify at least one advertising campaign goal of an advertising campaign (BLOCK 505). The method 500 can identify, based on the identified advertising campaign goal, one or more metrics that drive a performance of the advertising campaign (BLOCK 510). The method 500 can identify, for each of the one or more metrics, a plurality of dimensions corresponding to the metric that influence a performance of the metric (BLOCK 515). The method 500 can determine, for a subset of the identified dimensions corresponding to the metric, that a predetermined number of criteria corresponding to the dimension contribute at least a predetermined threshold percentage of the metric (BLOCK 520). The method 500 can generate for each of the one or more metrics, a plurality of cards corresponding to the subset of the identified dimensions corresponding to the metric, each card corresponding to a respective dimension of the identified dimensions and including a graphic, the graphic identifying, for each of the predetermined number of criteria, a contribution provided by the criteria towards the performance of the metric (BLOCK 525). The method 500 can display a subset of the plurality of cards in response to a request to view a summary of a performance of the advertising campaign (BLOCK 530).

In further detail, the data processing system can identify at least one advertising campaign goal of an advertising campaign (BLOCK 505). A third-party content provider or advertiser can establish or create one or more advertising campaigns. These advertising campaigns can be designed, constructed or configured to present ads in one or more ad slots on various information resources, for example, web pages. The advertiser can design the advertising campaign such that the ads can be shown on specific information resources. In some implementations, the advertiser can design the advertising campaign such that the ads can be shown to end user computing devices having certain profiles, for example, interests. In some implementations, the advertiser can design the advertising campaign such that the ads can be shown on web pages related to certain topics or keywords. In some implementations, the advertiser can design the advertising campaign such that the ads can be shown to end user computing devices included in one or more remarketing lists. In some implementations, the advertiser can set bid prices corresponding to an amount the advertiser is willing to pay to display the ad. Bids based on impressions can be based on cost per thousand impressions or cost per thousand (CPM). In some implementations, the advertiser can set bid prices corresponding to an amount the advertiser is willing to pay if an action is taken on the ad once the ad is displayed. In some implementations, bids based on actions can be based on cost per click or cost per action.

In some implementations, the data processing system can identify the advertising campaign goals of an advertising campaign by receiving the advertising campaign goals from an advertiser of the advertising campaign. In some implementations, the data processing system can submit a request to the advertiser requesting the advertiser to identify one or more advertising campaign goals of the advertising campaign. In some implementations, the data processing system can send a survey or a set of questions to the advertiser. The data processing system can identify the advertising campaign goals of the advertising campaign based on responses to the survey sent to the advertiser.

In some implementations, the data processing system can identify the advertising campaign goals of the advertiser based on one or more parameters, rules, or features of the advertising campaign. In some implementations, the data processing system can determine one or more goals of the advertising campaign based on the parameters of the advertising campaign relative to other advertising campaigns of the advertiser or relative to advertising campaigns of other advertisers competing in the same auctions.

In some implementations, the data processing system can identify goals by analyzing various parameters of the advertising campaign. In some implementations, the data processing system can be configured to identify the advertising campaign goals of the advertiser by determining, from the advertising campaign, a bid strategy implemented by the advertising campaign. In some implementations, the data processing system can determine the goals of an advertising campaign based on bid prices of the advertising campaign. In some implementations, the data processing system can determine the goals of an advertising campaign based on whether the advertiser is bidding on an impression basis or a per action basis. For instance, if the advertiser is willing on a per impression basis, the advertiser may be seeking to increase brand awareness by paying for impressions. Conversely, an advertiser that sets their bidding strategy to one that pays a bid amount once an action is taken on the ad, such as a click or conversion, the advertiser may likely be seeking to increase conversions or sales. Some advertisers may be in between the two spectrums of increasing brand awareness and increasing sales. It should be appreciated that advertisers having different goals may be interested in different types of metrics, as will be described below.

In some implementations, the data processing system can determine one or more goals of an advertising campaign by analyzing the types of content items or ads the advertiser provides for display. For instance, advertisers seeking to increase brand awareness may display ads with video, graphics or other features, while advertisers seeking to increase sales may display ads that are more simple and likely to cause an action to be taken on the ad that results in a conversion. The data processing system can be configured to heuristically determine which types of ads are more likely used to increase brand awareness and which types of ads are more likely to increase sales or conversions.

The data processing system can also determine one or more goals of an advertising campaign by analyzing one or more content selection dimensions of the advertising campaign. Examples of various dimensions include, but are not limited to keywords, interests and remarketing lists, topics, placements, demographics among others. The keyword dimension allows an advertiser to place bids to display content in auctions for certain keywords. The advertiser can select the keywords on which to place bids. The interests and remarketing dimension allows an advertiser to serve ads to end user computing devices identified based on the end user computing devices association with particular interests or remarketing lists selected by the advertiser in the interests and remarketing dimension. The topics dimension allows an advertiser to serve ads on web pages related to topics selected by the advertiser in the topics dimension. The placements dimension allows an advertiser to serve ads on web pages selected by the advertiser in the placements dimension.

An advertising campaign that includes a larger set of criteria in one or more dimensions may indicate that the advertising campaign is trying to increase the reach of the advertising campaign and therefore, is likely more focused on brand awareness relative to sales. Conversely, advertising campaigns that are directed towards a smaller set of criteria are likely to target a smaller set of end user computing devices and therefore, is likely more focused on sales relative to brand awareness.

The data processing system can identify, based on the identified advertising campaign goals, one or more metrics that drive a performance of the advertising campaign (BLOCK 510). In some implementations, the data processing system can track the performance of ads displayed via an advertising campaign. The data processing system can maintain a log of all ads provided for display, the one or more dimensions of the advertising campaign that caused the ad to be provided for display, the bid amount and type at which the ad was displayed, one or more criteria or profile characteristics of the end user computing device to which the ad was provided for display, the type of information resource or web page on which the ad was provided for display, the type of ad provided for display, and one or more actions, if any, that were taken on the ad when provided for display. The data processing system may store all of this information in a log stored in a database.

Based on the log containing data related to all ads provided for display, the data processing system can determine one or more metrics associated with the advertising campaign. Examples of metrics that the data processing system can track and display include impressions, clicks, click through rate, and costs per action, among others.

The data processing system can determine, from the metrics tracked by the data processing system, one or more metrics that may drive the performance of the advertising campaign. These metrics may be related to the identified goals of the advertising campaign. For instance, if the goal of the advertising campaign is to increase impressions, metrics that would be pertinent to the goal and that drive the performance of the advertising campaign may include impressions and average cost per thousand impressions (CPM). If the goal of the advertising campaign is to increase revenues or sales, the metrics that may be pertinent to the goal and that drive the performance of the advertising campaign may include sales, click through rate, and costs per conversion, among others.

The data processing system can identify, for each of the one or more metrics, a plurality of dimensions corresponding to the metric that influence a performance of the metric (BLOCK 515). The data processing system can identify, using the auction log, the performance of ads displayed via the advertising campaign and determine, for each of the one or more metrics identified as driving the performance of the advertising campaign, one or more dimensions corresponding to the metric that influence the performance of the metric. For instance, the data processing system may determine that the metric click through rate, drives the performance of an advertising campaign, such as the advertising campaign to which the display of FIG. 3 corresponds. The data processing system can identify, for the click-through metric, one or more dimensions corresponding to the impressions metric that influence or contribute to the performance of the metric. As shown in FIG. 3, the data processing system may determine that the dimensions keywords and placements influence the performance of the metric. A dimension may be determined to influence a performance of the metric if the level of influence exceeds a predetermined threshold. For instance, if ads selected based on keywords receive a predetermined threshold percentage of the number of total impressions received by ads of the advertising campaign, the data processing system may determine that keywords is a dimension that influences a performance of the metric. Conversely, if ads selected based on another dimension, such as topics, receive less than a predetermined threshold percentage of the number of total impressions received by ads of the advertising campaign, the data processing system can determine that the topics dimension fails to meaningfully influence the performance of the metric. It should be appreciated that click-through rate is a function of total impressions and as such, dimensions that do not influence impressions are unlikely to influence click-through rate of the advertising campaign. In some implementations, the predetermined threshold percentage can be anywhere from 5%-100%.

The data processing system can determine, for a subset of the identified dimensions corresponding to the metric, that a predetermined number of criteria corresponding to the dimension contribute at least a predetermined threshold percentage of the metric (BLOCK 520). In some implementations, the data processing system can determine, for a subset of the identified dimensions corresponding to the metric, that a predetermined number of criteria corresponding to the dimension contribute at least a predetermined threshold percentage of the metric in response to identifying, for each of the one or more metrics, a plurality of dimensions corresponding to the metric that influence a performance of the metric.

For a given metric, the data processing system can identify the plurality of dimensions that influence the performance of the metric. Upon identifying the plurality of dimensions that influence the performance of the metric, the data processing system can determine, for each of the dimensions identified as influencing the performance of the metric, one or more criteria of the dimension that contribute at least a predetermined threshold percentage of the metric. For instance, if the metric is click-through rate, and the data processing system determines that keywords is one dimension that influences the click-through rate metric, the data processing system can determine, for the keywords dimension, one or more keywords that contribute at least a predetermined threshold percentage of the metric. To do so, the data processing system can first determine all of the criteria of the keywords dimension. The data processing system can determine all of the criteria of the keywords dimension by identifying each of the ads selected for display that contributed in the total number of impressions received by the advertising campaign.

For each ad selected for display, determine if the ad was selected based on the information resource or web page matching a keyword included in the keywords dimension selected by the advertiser when establishing the advertising campaign. If the ad was selected based on a keyword included in the keywords dimension, the impression counts towards an impression count for the given keyword.

Once all of the ads selected for display are analyzed to see if a keyword of the keywords dimension should receive an impression count, the impression counts for each of the keywords in the keyword dimension are tallied. The data processing system can then determine, for each keyword in the keywords dimension, if the impression count of the keyword exceeds a predetermined threshold that is based on the total number of impressions received by the ads of the advertising campaign. A similar process can be implemented for determining criteria for various dimensions. It should be appreciated that there are a finite number of criteria for each dimension and the criteria are included in the advertising campaign of the advertiser.

In some implementations, the data processing system can then select only those keywords that have an impression count that exceeds the predetermined threshold, for example, 5% of all impressions received by ads of the advertising campaign. In some implementations, the data processing system can select a predetermined number of keywords, for instance, the top six keywords with the highest impression count. As shown in the card 330 of FIG. 3, 6 different keywords of the keywords dimension are shown along with an average click-through rate for ads selected based on the keywords dimension.

The data processing system can generate for each of the one or more metrics, a plurality of cards corresponding to the subset of the identified dimensions corresponding to the metric (BLOCK 525). Each card can correspond to a respective dimension of the identified dimensions and include a graphic. The graphic can identify, for each of the predetermined number of criteria, a contribution provided by the criteria towards the performance of the metric. Referring to the keywords dimension card 330 shown in FIG. 3, a chart including bars representing the top 6 keywords in terms of impression count are shown and the height of the bars indicate a click through rate of the respective keyword associated with the bar. For instance, a bar 332a represents the keyword "High-end Fashion" and has a click through rate of about 2.4%, while a bar 332b represents the keyword "Sandals" and has a click through rate of about 0.6%. A bar 334 represents the average click-through rate of ads selected based on the keywords dimension.

The data processing system can generate a plurality of cards for each of the metrics identified in BLOCK 510. For each metric, the data processing system can generate a card for each dimension identified in BLOCK 515 using information associated with criteria of the dimension that is determined in BLOCK 520. The data processing system can generate a card including a graphic that depicts each of the criteria identified in BLOCK 520. The graphic can show a value of each of the criteria that corresponds to the metric identified in BLOCK 510. In some implementations, the graphic can also show an average value based on the impressions received by ads of the advertising campaign that were selected based on the dimension identified in BLOCK 515. The graphic can include a bar chart, a pie chart, a line graph, or any other visual that can identify an impact a particular criterion of the dimension has on the metric. In some implementations, the graphic can be dynamic in that when a mouse, cursor or other object engages with the visual object representing a particular criteria, a value may be displayed, such as the pop up 344 shown in FIG. 3

The data processing system can display a subset of the plurality of cards in response to a request to view a summary of a performance of the advertising campaign (BLOCK 530). In some implementations, the data processing system can receive a request from an advertiser to display a summary of the performance of the advertising campaign. In some implementations, the data processing system can provide a user interface that includes a tab or actionable object, which when an action is taken on, causes the data processing system to provide a summary of the advertising campaign. The summary is based on one or more of the identified goals of the advertising campaign. As such, if the identified goal of the advertising campaign is brand awareness, the summary can display information related to metrics that are relevant to brand awareness, for instance, impressions and click through rate. Conversely, if the identified goal of the advertising campaign is revenue growth or generation, the summary can display information related to metrics that are relevant to revenues, for instance, sales and cost per conversion.

The data processing system can provide, for display, one or more selectable metric objects, which when selected, display information specific to the selected metric. The data processing system can also display, on the same user interface, a leaderboard that displays a graph of the particular metric over a predetermined time period. In some implementations, the graph can be dynamic and interactive. In some implementations, the graph can include one or more actionable objects positioned at various points along the graph that correspond to certain dates along the predetermined time period. The actionable objects can correspond to changes made to the advertising campaign, for example, an increase to a bid amount, or adding new keywords to the keywords dimension. In this way, an advertiser can easily understand that a particular change in the graph around a particular actionable object may be linked to a change to the advertising campaign that is identified by the actionable object.

The data processing system can also display cards corresponding to dimensions of the metric. In some implementations, each card can be dedicated to a particular dimension of the metric. In some implementations, the cards can be positioned on the display in order of impact. In some implementations, the cards can be positioned on the display according to an order of attention. That is, dimensions that are adversely affecting the performance of the advertising campaign may be displayed before dimensions that are positively affecting the performance of the advertising campaign. In some implementations, the size, background color and shape of the cards may also indicate whether the dimension is adversely or positively affecting the performance of the advertising campaign.

In some implementations, the data processing system can determine, for each of the dimensions corresponding to a given metric identified in BLOCK 510, an impact score of the dimension based on an aggregate contribution of the criteria corresponding to the predetermined number of criteria. The data processing system can determine an aggregate contribution of the criteria of the dimension corresponding to the predetermined number of criteria to be included in the card. As described above, the predetermined number of criteria can be six. To determine the aggregate contribution of the top six criteria of the dimension, the data processing system can determine a metric value based on ads selected for display based on the top six criteria of the dimension. For instance, if the metric is impressions and the dimension is placements, the data processing system can determine the total number of impressions received by ads selected for display based on the top six websites included in the placements dimension. The data processing system can then determine an order in which to arrange the generated cards based on the aggregate contribution of the criteria corresponding to the predetermined number of criteria and display the cards based on the determined order.

Figure 6:
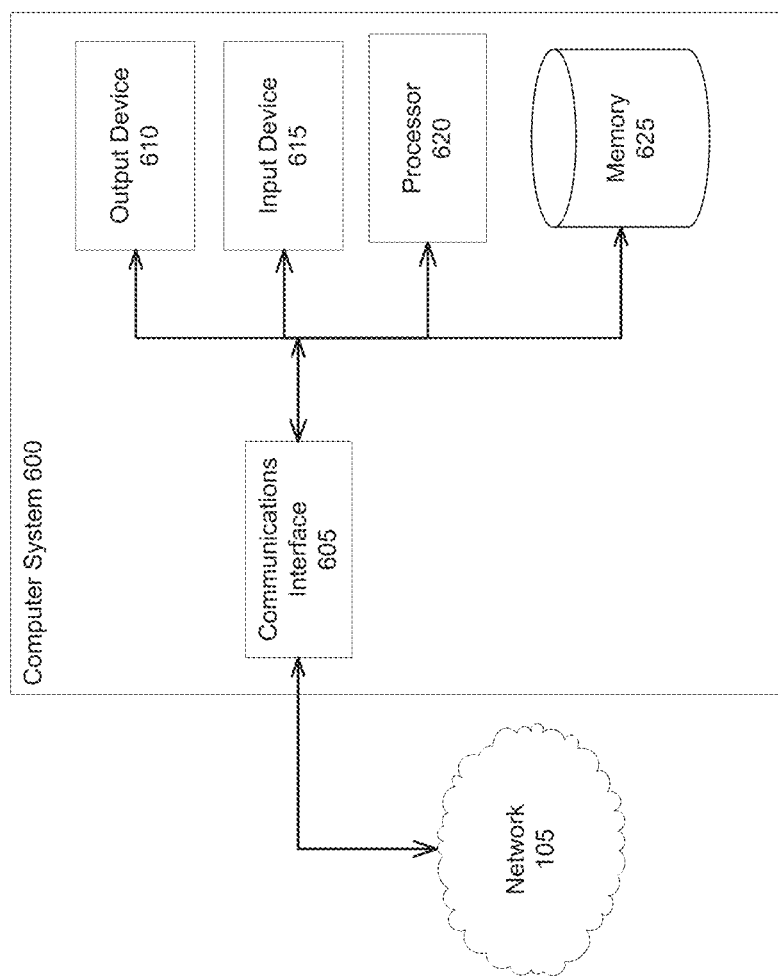
FIG. 6 is a block diagram illustrating a general architecture for a computer system that may be employed to implement elements of the systems and methods described and illustrated herein, according to an illustrative implementation.

FIG. 6 shows the general architecture of an illustrative computer system 600 that may be employed to implement any of the computer systems discussed herein (including the system 110 and its components such as the advertising campaign goal identification module 130, the card generation module 132 and the card display module 134) in accordance with some implementations. The computer system 600 can be used to provide information via the network 105 for display. The computer system 600 of FIG. 6 comprises one or more processors 620 communicatively coupled to memory 625, one or more communications interfaces 605, and one or more output devices 610 (e.g., one or more display units) and one or more input devices 615. The processors 620 can be included in the data processing system 110 or the other components of the system 110 such as the advertising campaign goal identification module 130, the card generation module 132 and the card display module 134.

In the computer system 600 of FIG. 6, the memory 625 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 110 of FIG. 1, the data processing system 110 can include the memory 625 to store information related to the availability of inventory of one or more content units, reservations of one or more content units, among others. The memory 625 can include the database 140. The processor(s) 620 shown in FIG. 6 may be used to execute instructions stored in the memory 625 and, in so doing, also may read from or write to the memory various information processed and or generated pursuant to execution of the instructions.

The processor 620 of the computer system 600 shown in FIG. 6 also may be communicatively coupled to or control the communications interface(s) 605 to transmit or receive various information pursuant to execution of instructions. For example, the communications interface(s) 605 may be coupled to a wired or wireless network, bus, or other communication means and may therefore allow the computer system 600 to transmit information to or receive information from other devices (e.g., other computer systems). While not shown explicitly in the system of FIG. 1, one or more communications interfaces facilitate information flow between the components of the system 60. In some implementations, the communications interface(s) may be configured (e.g., via various hardware components or software components) to provide a website as an access portal to at least some aspects of the computer system 600. Examples of communications interfaces 605 include user interfaces (e.g., web pages), through which the user can communicate with the data processing system 60.

The output devices 610 of the computer system 600 shown in FIG. 6 may be provided, for example, to allow various information to be viewed or otherwise perceived in connection with execution of the instructions. The input device(s) 615 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The advertising campaign goal identification module 130, the card generation module 132 and the card display module 134 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 600 or system 110 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the advertising campaign goal identification module 130, the card generation module 132 and the card display module 134 can be part of the data processing system 110, a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to displaying a summary of a performance of an advertising campaign, the systems and methods described herein can be applied to any program in any vertical in which a summary of information is to be provided via cards. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method, comprising:
   transmitting, by a client device to a card generation module executed by a data processing system, in response to an interaction in a browser window with an actionable object shown in the browser window that identifies a metric, a selection of the metric;
   receiving, by the client device from the card generation module executed by the data processing system, a plurality of card objects selected by the data processing system in response to receiving the selection of the metric, each of the plurality of card objects comprising a first display format and information about the metric;
   determining, by the client device, a size of the browser window;
   setting, by the client device, a threshold based on the size of the browser window, the threshold corresponding to a contribution of the information about the metric;
   selecting, by the client device, a first subset of the plurality of card objects responsive to the contribution of the information of each card object of first subset being above the threshold; and
   rendering, in the browser window by the client device, the first subset of the plurality of card objects in the first display format, and displaying, within each card object of the first subset of the plurality of card objects, a respective graphic that identifies a respective contribution of each the information of the first subset of the plurality of card objects to the metric.

2. The method of claim 1, wherein each of the plurality of card objects comprise a second display format.

3. The method of claim 2, further comprising rendering, in the browser window, a second subset of the plurality of card objects, different than the first subset of the plurality of card objects, in the second display format.

4. The method of claim 1, further comprising rendering, in the browser window, a second subset of the plurality of card objects in a card pile beneath a rendered card object of the first subset of the plurality of card objects, wherein the second subset of the plurality of card objects are different from the first subset of the plurality of card objects.

5. The method of claim 4, wherein the card pile is rendered at a first location in the browser window, and further comprising:
removing the rendered card object of the first subset of the plurality of card objects responsive to an input received in the browser window; and
rendering, at the first location in the browser window, a card object of the second subset of the plurality of card objects.

6. The method of claim 1, further comprising:
rendering one of the first subset of the plurality of card objects at a first location in the browser window; and
rendering the one of the first subset of the plurality of card objects at a second location in the browser window responsive to an input received in the browser window.

7. The method of claim 1, wherein each of the plurality of card objects comprises an indication of statistical significance of the dimension corresponding to the metric.

8. The method of claim 7, further comprising selecting the first subset of the plurality of card objects from the plurality of card objects based on the indication of statistical significance of each of the plurality of card objects.

9. The method of claim 1, wherein the dimension is one of a keyword, an interest, a topic, or a placement.

10. The method of claim 1, further comprising selecting the first subset of the plurality of card objects from the plurality of card objects based on a device type of the client device.

11. A system to select content for display comprising at least one processor and a memory storing processor executable instructions, execution of the processor executable instructions causes the at least one processor to:
transmit, to a device to a card generation module executed by a data processing system, in response to an interaction in a browser window with an actionable object shown in the browser window that identifies a metric, a selection of the metric;
receive, from the card generation module executed by the data processing system, a plurality of card objects selected by the data processing system in response to receiving the selection of the metric, each of the plurality of card objects comprising a first display format and information about the metric;
determine a size of the browser window;
set a threshold based on the size of the browser window, the threshold corresponding to a contribution of the information about the metric;
select a first subset of the plurality of card objects responsive to the contribution of the information of each card object of the first subset being above the threshold; and
render, in the browser window, the first subset of the plurality of card objects in the first display format, and display, within each card object of the first subset of the plurality of card objects, a respective graphic that identifies a respective contribution the information of each of the first subset of the plurality of card objects to the metric.

12. The system of claim 11, wherein each of the plurality of card objects comprise a second display format.

13. The system of claim 12, wherein execution of the processor executable instructions causes the at least one processor to render, in the browser window, a second subset of the plurality of card objects different than the first subset of the plurality of card objects in the second display format.

14. The system of claim 11, wherein execution of the processor executable instructions causes the at least one processor to render, in the browser window, a second subset of the plurality of card objects in a card pile beneath a rendered card object of the first subset of the plurality of card objects, wherein the second subset of the plurality of card objects are different from the first subset of the plurality of card objects.

15. The system of claim 14, wherein the card pile is rendered at a first location in the browser window, and wherein execution of the processor executable instructions causes the at least one processor to:
remove the rendered card object of the first subset of the plurality of card objects responsive to an input received in the browser window; and
render, at the first location in the browser window, a card object of the second subset of the plurality of card objects.

16. The system of claim 11, wherein execution of the processor executable instructions causes the at least one processor to:
render one of the first subset of the plurality of card objects at a first location in the browser window; and
render the one of the first subset of the plurality of card objects at a second location in the browser window responsive to an input received in the browser window.

17. The system of claim 11, wherein each of the plurality of card objects comprises an indication of statistical significance of the dimension corresponding to the metric.

18. The system of claim 17, wherein execution of the processor executable instructions causes the at least one processor to select the first subset of the plurality of card objects from the plurality of card objects based on the indication of statistical significance of each of the plurality of card objects.

19. The system of claim 11, wherein the dimension is one of a keyword, an interest, a topic, or a placement.

20. The system of claim 11, wherein execution of the processor executable instructions causes the at least one processor to select the first subset of the plurality of card objects from the plurality of card objects based on a device type of a client device to which the at least one processor belongs.

* * * * *